Patented Apr. 17, 1951

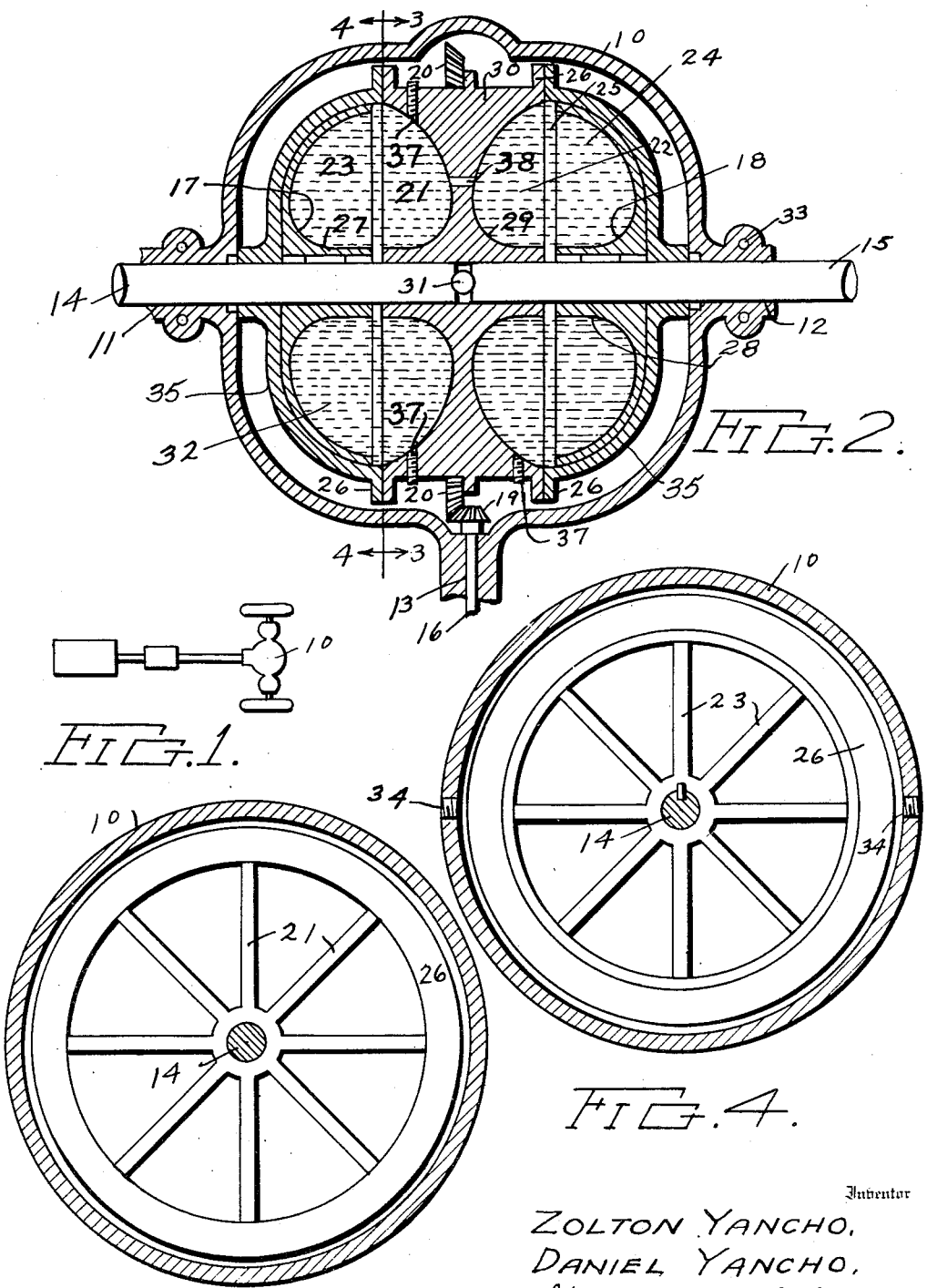

2,549,557

UNITED STATES PATENT OFFICE 2,549,557

DIFFERENTIAL DRIVE TURBINE TYPE FLUID COUPLING

Zolton Yancho and Daniel Yancho, Essex, Md.

Application January 18, 1946, Serial No. 641,933

1 Claim. (Cl. 60—54)

This invention relates to mechanisms for the transmission of power and more particularly to that class of devices known as differentials.

In the conventional form of differentials used on motive-vehicles the mechanism consists strictly of gearing meshing directly from the propelling shaft gear to the gears mounted on the shafts carrying the wheels to be rotated.

In this invention, the object is to provide a new and improved differential mechanism that will avoid one or more of the disadvantages and limitations of the prior art.

Another object of the present invention is to provide a new and improved differential mechanism, that will operate as a fluid drive.

An additional object of the invention to be described is to provide a new and improved differential mechanism that will operate as a fluid drive having the driving and driven parts connected thereto and providing for adjustment of the parts to unequal stresses and speeds that may be induced therein.

Other objects will become apparent as the invention is more fully set forth.

For a better understanding of the invention reference is made to the appended drawing and the following description, which detail the features of a form of this invention by way of example, while the scope of the invention is particularly pointed out in the claim.

In the drawing:

Figure 1 is a plan view showing an automobile, embodying this invention;

Figure 2 is a sectional view through the differential;

Figure 3 is a sectional view taken along line 3—3 of Figure 2, and

Figure 4 is a sectional view taken along line 4—4 of Figure 2.

Similar reference characters refer to similar parts throughout the drawing.

In the structure indicated, a differential housing 10 is provided with openings 11, 12 and 13 which respectively receive a wheel shaft 14, another wheel shaft 15 and a propelling or power shaft 16. The wheel shaft 14 inserts and keys into an end dish-pan vaned runner 17 in the housing that is designed for its rotation therein. Likewise the wheel shaft 15 is inserted and keyed in a second end dish-pan runner 18. This runner is vaned also.

The shaft 16 carries a miter gear 19 whose teeth engage the teeth of a ring gear 20. This ring gear 20 is mounted on the external peripheral surface of a dual dishpan impeller 30 having its internal vanes 21 and 22 directed towards the internal vanes 23 and 24 respectively of the runners 17 and 18. All impellers used are preferably provided with flanges 26 that serve to facilitate their alignment and operation. The wheel runners 17 and 18 are formed with lateral and central hubs 27 and 28, through which the shafts 14 and 15 respectively project and terminate adjacent each other in the middle of the hub 29 formed in the impeller 30 and press against a ball bearing 31 held in the hub 29. The shafts serve to support the runners in their respective places in the housing. The runners are set in predetermined positions and are not intended to move from these positions, except during assembling and dismantling. The runners are spaced with their faces about one-eighth of an inch from the impeller as indicated at 25 and sufficient clearance is otherwise afforded to permit free rotation of the runners and impeller in the housing. The transmission fluid 32 practically fills the housing and is of suitable viscosity and mechanical tenacity to produce the necessary pull between the impeller and runners. The housing is preferably made in two bell-shaped halves held together by bolts 33. The external contour of the impeller conforms in general to that of the housing halves. The housing is provided with plugs 34 and the impeller has plugs 37 for use in filling them with fluids or for draining them.

In the operation of the differential the plug 37 is removed and transmission fluid 32 is placed in the impeller housing 30 and oil is placed in the housing 10. The power shaft 16 rotates the gear 19, the ring gear 20 and the dual impeller 30. The fluid pressure is equalized on both sides of the dual impeller through a hole 38 which connects both compartments and allows the fluid to engage the vanes 23 and 24 respectively causing the end runners 17 and 18 to follow. Slippage between the runners and the impeller depends on the type of fluid used and the speed of operation. It can be made efficient and reliable if the transmission fluid is properly selected. The vanes of the runners are radially disposed with respect to the axis of the shafts with which they are associated and they protrude inwardly of the runner shells into the transmission fluid to form a series of pockets between adjacent vanes. The fluid drive advantages are just as apparent for the differential as they are for the transmission elements of a motor vehicle which this device has eliminated in several instances. In addition it does away with the clashing and wearing of rear gearing that rigidly takes up the stresses and loads put on it and which frequently causes the gear teeth to break thus putting the differential out of operation. This arrangement takes up stresses placed upon it with a cushioning effect that avoids any excessive strains. It reduces many repairs that are usually routine with other types of differentials, and this in turn avoids the considerable expense that differential construction involves. If the conventional differential is so assembled that the gears are not accurately meshed by very skilled mechanics, the chances of quick wear and broken teeth are considerably increased. With the type of differential described herein, extremely accurate adjustment of the impeller to the runners is not essential, as it will operate effectively within considerable limits.

While but one general form of the invention is shown in the drawing and described in the specifications, it is not desired to limit this application for patent to this particular form or in any other way otherwise than limited by the scope of the appended claim.

Having thus described the invention what is claimed is:

In a differential drive fluid coupling, a casing, said casing comprising a medial impeller having a single wall provided with external radially disposed vanes and complementary arcuate casing portions secured to said impeller to form liquid chambers between said impeller and said casing portions, a pair of co-axial runner shafts extending freely through said casing, said shafts having spaced terminal ends within said casing, a frictionless bearing between said ends, a pair of runners, each of which is housed in each casing portion, said runners having vanes cooperating with the vanes of said impeller, and each of said runners being keyed to its respective shaft, passage means through the wall of said impeller placing the chambers on either side thereof in communication, a housing surrounding and spaced from said casing and having bearing portions for said shafts, a circular crown peripherally carried by said casing, a ring gear carried thereby, means for driving said ring gear carried by the housing, additional passage means through the wall of the impeller to place the space between the housing and casing and the liquid chambers in communication, and plugs for blocking these passages and the passages in the housing to provide access to these plugs.

ZOLTON YANCHO.
DANIEL YANCHO.

REFERENCES CITED

The following references are of record in the file of this patent:

UNITED STATES PATENTS

| Number | Name | Date |
|---|---|---|
| 1,613,154 | Bauer et al. | Jan. 4, 1927 |
| 1,888,881 | Murphy | Nov. 22, 1932 |
| 2,096,070 | Sinclair | Oct. 19, 1937 |
| 2,240,270 | Schaefer | Apr. 29, 1941 |
| 2,250,885 | Batten | July 29, 1941 |

FOREIGN PATENTS

| Number | Country | Date |
|---|---|---|
| 285,970 | Great Britain | Feb. 23, 1928 |